United States Patent [19]
Bogiel et al.

[11] Patent Number: 5,083,937
[45] Date of Patent: Jan. 28, 1992

[54] WIRE-TRAP ELECTRICAL CONNECTOR

[75] Inventors: Steven B. Bogiel, Schaumburg; Mark M. Data, Bolingbrook; Robert DeRoss, Naperville; David M. Skowronski, Naperville; Michael J. O'Connell, Naperville, all of Ill.

[73] Assignee: Molex Incorporated, Lisle, Ill.

[21] Appl. No.: 709,670

[22] Filed: Jun. 3, 1991

[51] Int. Cl.$^5$ ............................................. H01K 4/24
[52] U.S. Cl. .................................................... 439/441
[58] Field of Search ................................. 439/436–441

[56] References Cited

U.S. PATENT DOCUMENTS

| | | |
|---|---|---|
| 3,383,640 | 5/1968 | Godziemba-Dambski et al. ........................................ 439/436 |
| 3,916,149 | 10/1975 | Skinner .................................. 439/437 |

Primary Examiner—Joseph H. McGlynn
Attorney, Agent, or Firm—Louis A. Hecht; Stephen Z. Weiss; A. A. Tirva

[57] ABSTRACT

An electrical connector is provided of the wire-trap type. The connector includes a housing defining an interior cavity with a passage through the cavity for receiving an in-line conductor. A pair of openings are provided in the housing for receiving the stripped ends of a pair of electrical wires. A generally U-shaped terminal is disposed in the cavity of the housing and includes a pair of leg portions joined by a bight portion. The leg portions have wire-trapping distal ends in registry with the openings for deflectingly engaging and trapping the stripped ends of the electrical wires inserted into the openings. The bight portion has a terminating section in registry with the passage for termination to the in-line conductor.

21 Claims, 7 Drawing Sheets

WIRE-TRAP ELECTRICAL CONNECTOR

FIELD OF THE INVENTION

This invention generally relates to the art of electrical connectors and, particularly, to an electrical connector of the wire-trap type.

BACKGROUND OF THE INVENTION

There are a variety of wire-trap electrical connectors known in the art. Basically, a wire-trap connector is designed to allow easy insertion of a wire into the connector in engagement with a terminal, but it is very difficult if not impossible to remove the wire from the connector as by pulling.

Such connectors are used in a wide variety of applications. One application or environment within which such connectors would be desirable but presently are not available, is in the area of modular wall panel and modular furniture systems. These systems incorporate wall panel modules which divide a space into defined work areas, such as in office or similar facilities. Each work area has a need for electrical outlets to accommodate computers and any number of other electrical or electronic devices as well as communication devices. In some wall panel systems, electrical or communications networks are hard wired directly into the panels themselves In other systems, raceways are provided either in or along edges of the wall panels within which electrical and/or communications networks are mounted by means of harnesses.

Although modular wall panel and modular furniture systems, themselves, have been designed to provide versatility in dividing a particular space into various work areas, and although providing electrical and/or communications networks to the panels by means of interchangeable harnesses have provided some degree of networking flexibility, there still remains a considerable need for flexibility within the network systems themselves. For instance, it is rather expensive to change a networking system by changing the entire harnesses themselves.

This invention is directed to the design of a unique wire-trap electrical or communications connector which provides a considerable degree of flexibility within the connector and the system in which the connector is employed.

SUMMARY OF THE INVENTION

An object, therefore, of the invention is to provide a new and improved electrical connector of the wire-trap type.

In the preferred embodiment of the invention, generally, the connector includes housing means defining an interior cavity and including passage means for receiving an in-line conductor. A pair of openings are provided in the housing for receiving the stripped ends of a pair of electrical wires. A generally U-shaped terminal is disposed in the cavity of the housing means and includes a pair of leg portions joined by a bight portion. The leg portions have wire-trapping distal ends in registry with the openings for deflectingly engaging and trapping the stripped ends of the electrical wires inserted into the openings. The bight portion of the terminal has terminating means in registry with the passage means for termination to the in-line conductor.

As disclosed herein, the distal ends of the leg portions are generally V-shaped to provide a two-point contact with the stripped ends of the electrical wires. The terminating means on the bight portion of the U-shaped terminal provide insulation displacement or crimping means for connecting the terminal onto the in-line conductor. Preferably, the terminal is fabricated as a one-piece component of stamped and formed metal material.

The housing means of the connector include a base and a generally hollow body complementarily latchable to the base. The openings in the housing means for receiving the stripped ends of the pair of electrical wires are provided in the body. The passage means for receiving the in-line conductor is provided, at least in part, in the base. The housing means is generally box-shaped and the passage means are defined by opposing portions of the base and the body of the housing means.

Still further, the housing means include partition means between the pair of openings to prevent the stripped ends of the pair of electrical connectors from engaging. In the exemplary embodiment of the invention, the housing means include a plurality of cavities in a side-by-side relationship, with a pair of the openings and one of the passage means for each cavity, for accommodating a plurality of terminals, a plurality of in-line conductors and a plurality of electrical wires.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
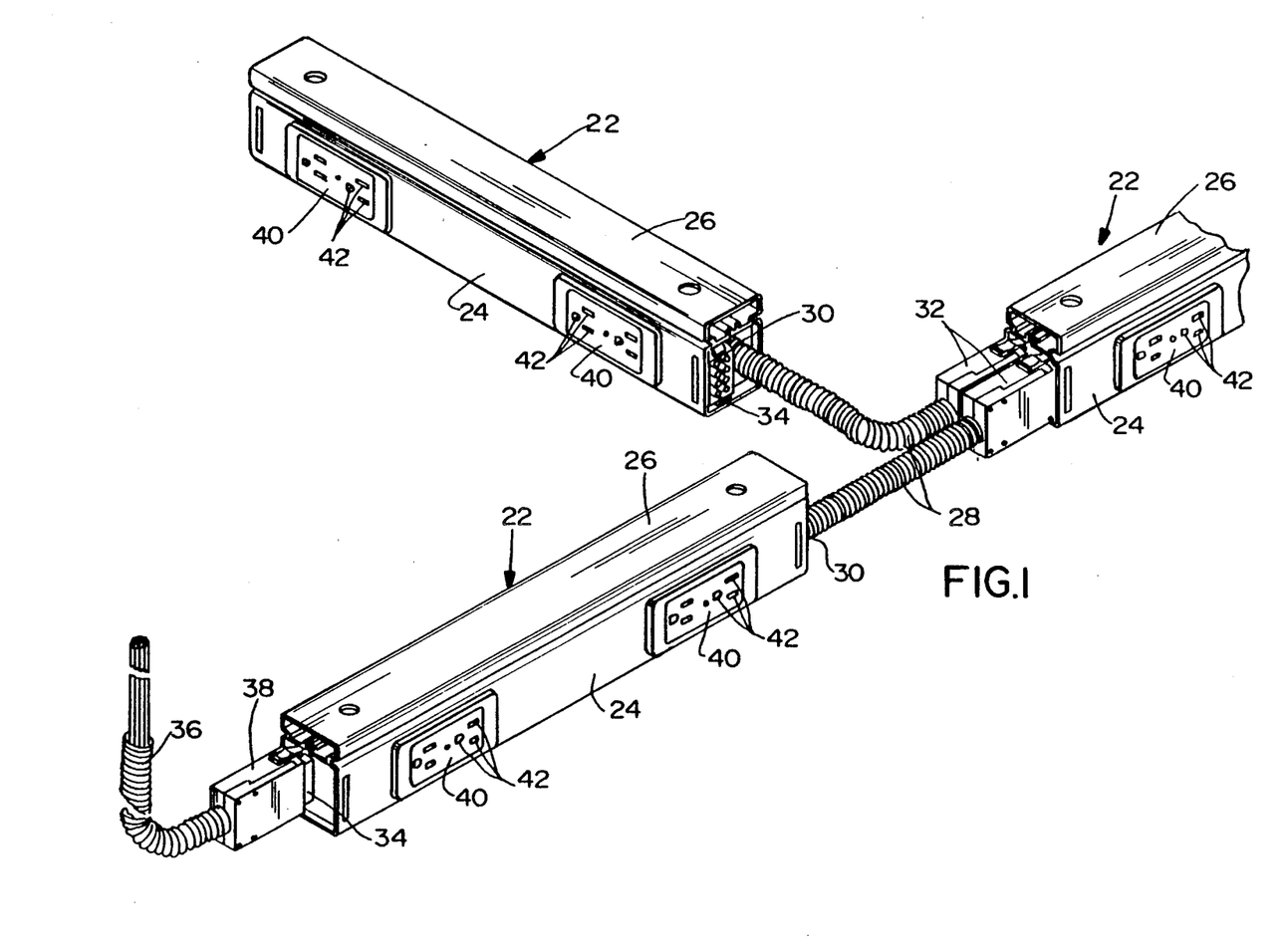
FIG. 1 is a perspective view of a harness system which might be used in a three-panel modular wall system, the wire-trap electrical connectors of the invention being located within the various power modules of the harness.
Figures 2, 4:
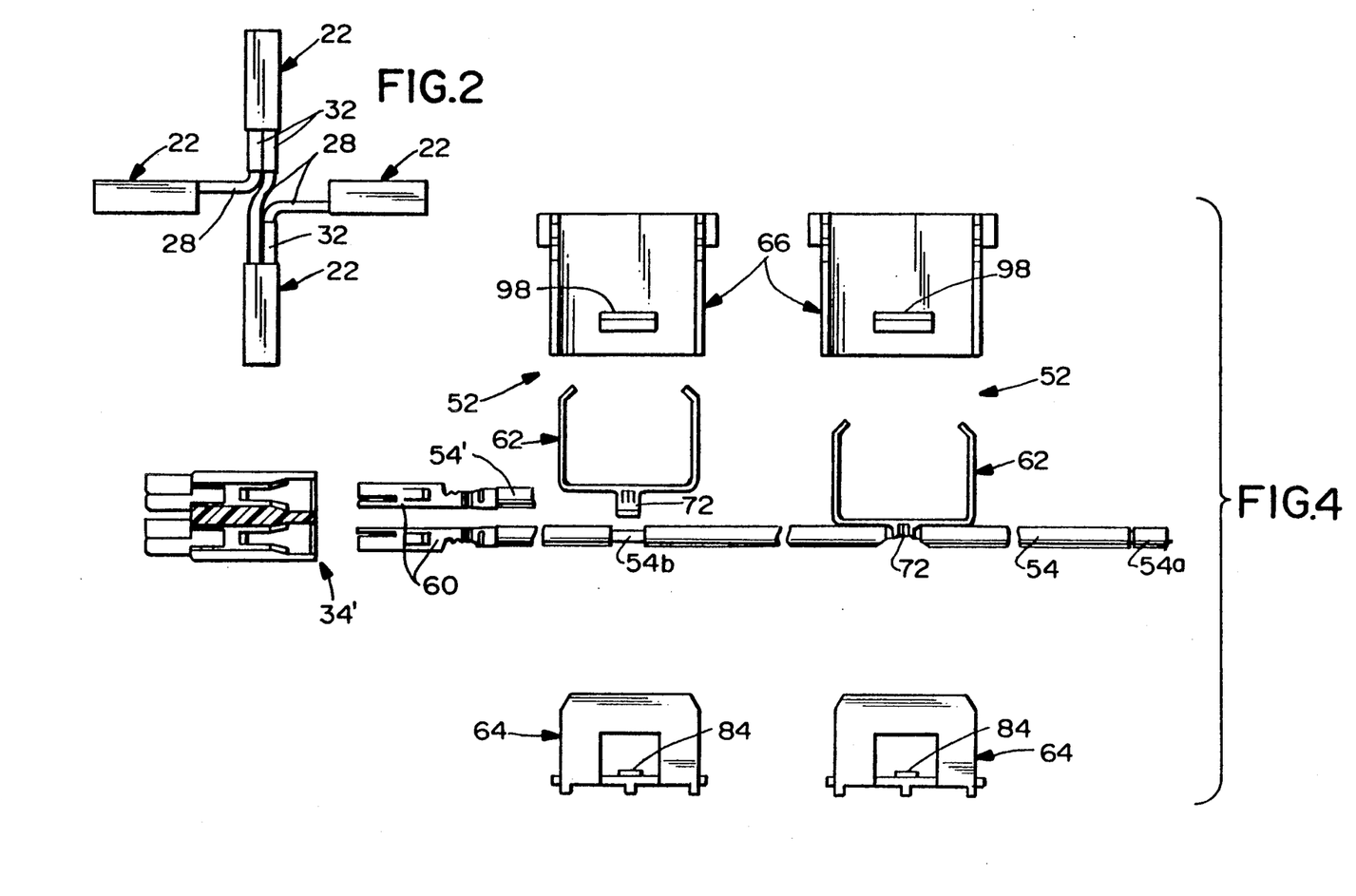
FIG. 2 is a schematic top plan view of a harness system as might be used in a four-panel modular wall system.
FIG. 4 is an exploded elevational view of the components of a pair of wire-trap electrical connectors in relation to an in-line conductor.

Referring to the drawings in greater detail, and first to FIG. 1, although the invention has a wide range of applications, the invention is disclosed herein as embodied in an electrical or communications networking system incorporated in power modules as might be used in a modular wall panel system. For instance, FIG. 1 shows three power modules, generally designated 22, each of which includes an elongated housing 24 having an elongated mounting bracket 26 on the top thereof. Each power module is designed for mounting either along an edge, such as the top edge or bottom edge, of a modular wall panel or in a raceway provided in the panel edge. As shown in FIG. 1, with mounting brackets 26 positioned on top of housings 24, the power modules would be mounted along the bottom edges of the wall panels. With the system shown in a T-shaped configuration in FIG. 1, obviously the networking system is arranged to be mounted in conjunction with three wall panels meeting at a T-shaped juncture. In comparison, FIG. 2 schematically shows four power modules 22 interconnected at a juncture of four wall panels.

Power modules 22 are interconnected by flexible cables 28 which either run out of one end of the respective power module, or the flexible cables are connected to power module connectors 32 which mate with complementary receptacle connectors 34 mounted in the ends of the power modules. A flexible feed cable 36 is shown with a feed connector 38 coupled to one of the connectors 34 at the end of the left-hand power module 22. Of course, the specific arrangement of power modules, flexible cables, connectors, as well as the point of feeding the system, depends upon the particular electrical and/or communications needs of the modular wall panel system with which the networking or distribution system is to be used.

Still referring to FIG. 1, each power module 22 has appropriate openings on the side thereof for receiving outlet receptacles 40 generally flush with the sides of the power modules. Again, these receptacles can be of varying configurations, but those shown in the drawings are designed with sets 42 of three apertures for receiving a conventional electrical plug having two blade prongs and one round grounding prong.

Figure 3:
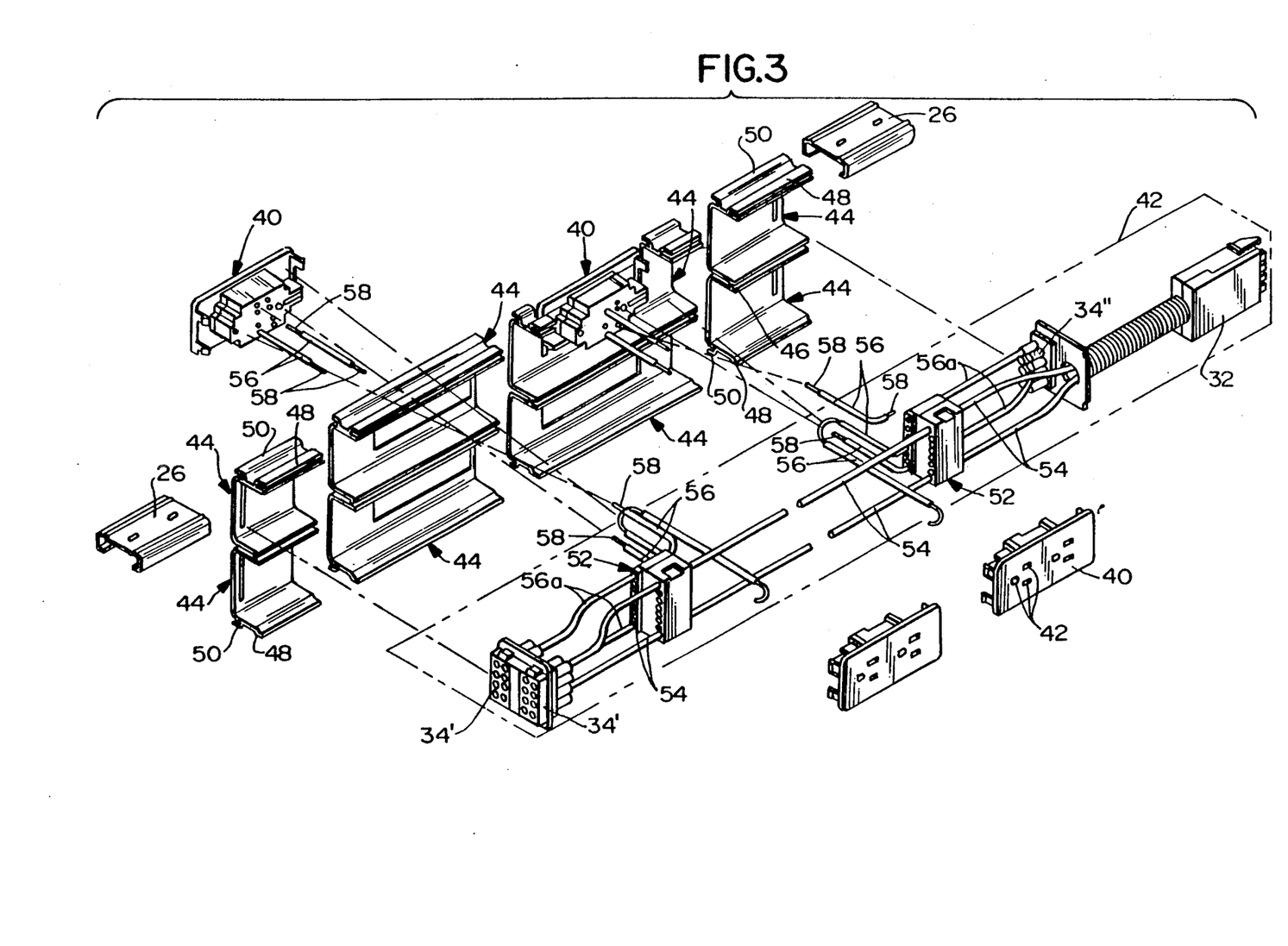
FIG. 3 is an exploded perspective view of one of the power modules shown in FIG. 1.
Figure 5:
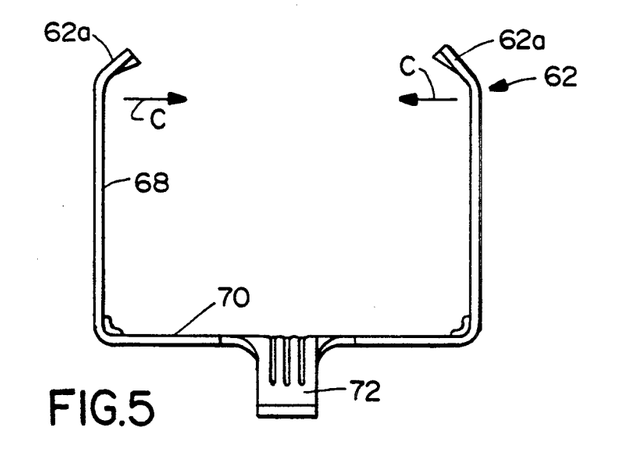
FIG. 5 is a side elevational view of the U-shaped terminal of the wire-trap electrical connector.
Figure 6:
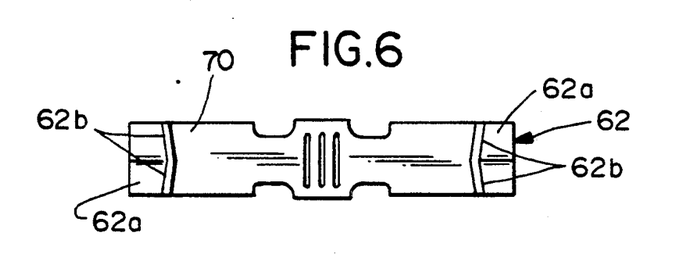
FIG. 6 is a top plan view of the terminal of FIG. 5.
Figure 7:
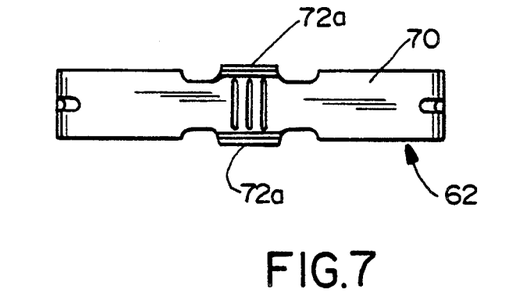
FIG. 7 is a bottom plan view of the terminal of FIG. 5.

FIG. 3 shows an exploded depiction of the components of one of the power modules 22, and like numerals have been applied to like components described in relation to FIG. 1. Suffice it to say that the overall area encompassed by the power module is indicated by the rectangular dotted line 42. The housing itself is formed by a pair of U-shaped, elongated members 44 hinged together, as at 46, to completely enclose the interior components of the power module when the elongated members are snapped together by complementary latch means 48. Mounting bracket 26 is mounted to the housing by outwardly turned flanges 50 molded integrally with elongated members 44 which preferably are formed of dielectric material, such as plastic or the like.

The invention is embodied in a wire-trap type electrical connector, generally designated 52, and two of which are shown in the harness system of FIG. 3. As will be understood in greater detail hereinafter, the connectors are designed for accommodating one or more in-line conductors 54 which are shown running the entire length of the power module. As shown, the in-line conductors run from a receptacle connectors 34' at one end (the left-hand end) of the system, through both connectors 52, and to a flexible cable 28 which has a power module connector 32 terminated to the end thereof. Wire-trap electrical connectors 52 also are designed to accommodate discrete wire lengths 56 having their ends stripped, as at 58, to expose the central conductors thereof. The stripped conductors are trapped within connectors 52 and are terminated to appropriate terminals in receptacles 40 as is known in the art. In addition, discrete wires 56a are shown terminated between connectors 52, and the end receptacle connector 34" shown in the particular harness system illustrated in FIG. 3.

Referring to FIG. 4, one in-line conductor 54 is shown running through an exploded depiction of the pair of wire-trap connectors 52, as in the system of FIG. 3. In particular, end 54a of the in-line conductor would run through flexible cable 28 (FIG. 3), and the other end of the in-line conductor is shown terminated to a terminal 60 of receptacle connector 34'. The in-line conductor also has a stripped section 54b to expose the conductor thereof for each wire-trap connector 52. A portion 54' of a second in-line conductor is shown simply to illustrate at this early stage that each wire-trap connector 52 can accommodate a plurality of in-line conductors.

FIG. 4 also shows that each wire-trap electrical connector 52 is very simply fabricated of three basic components, mainly a generally U-shaped terminal 62, a base, generally designated 64, and a body, generally designated 66. The base and the body are interconnectable, as described hereinafter, to define a box-like housing means for completely enclosing terminal 62.

FIGS. 5–8 show various views of one of the U-shaped terminals 62 of each wire-trap connector 52. More particularly, each terminal includes a pair of leg portions 68 joined by a bight portion 70. The terminal is unitarily formed of stamped and formed conductive material, and bight portion 70 includes a crimp section 72 intermediate its ends for crimping onto stripped conductor section 54b (FIG. 4) of in-line conductor 54.

Figure 8:
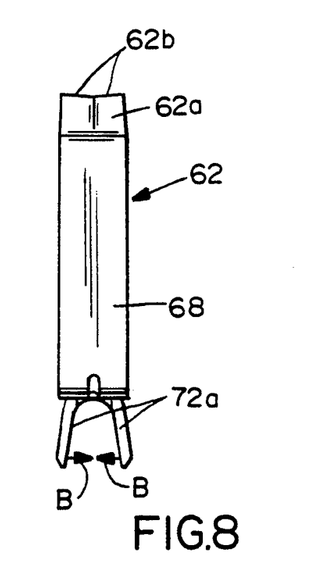
FIG. 8 is an end elevational view of the terminal of FIG. 5.
Figure 9:
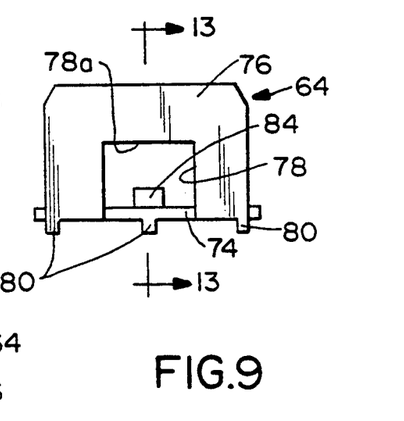
FIG. 9 is a side elevational view of the base of the housing means of the wire-trap electrical connector.

As seen in FIG. 8, crimp section 72 is of a generally inverted U-shape, having depending leg portions 72a which are crimped inwardly in the direction of arrows "B" for establishing a solid contact with the stripped conductor section 54b of the respective in-line conductor.

The distal ends 62a of each leg 68 of terminal 62 are bent inwardly and are provided with a generally V-shape. This shape provides a two-point contact, as at 62b (FIG. 6), between the terminal and the stripped ends 58 (FIG. 3) of discrete wires 56. Upon insertion of the stripped ends of the discrete wires into the connector, legs 68 of terminal 62 will deflect inwardly in the direction of arrows "C" (FIG. 5) whereupon the stripped ends of the wires seat within the V-shaped configuration at the distal ends of the legs, and removal of the wires against the direction of deflection of the legs is prohibited.

FIGS. 9-13 show various views of base 64 of each wire-trap electrical connector 52. More particularly, each base includes a bottom wall 74 and a pair of side walls 76. Each side wall includes a generally rectangular aperture 78 which forms part of a complementary interengaging latch means between base 64 and its respective body 66 (FIG. 4), as will be described in greater detail hereinafter. As seen in the bottom plan view of FIG. 11, stiffening ribs 80 are molded integrally with the underside of bottom wall 74. The base is unitarily molded of dielectric material, such as plastic or the like.

Figure 10:
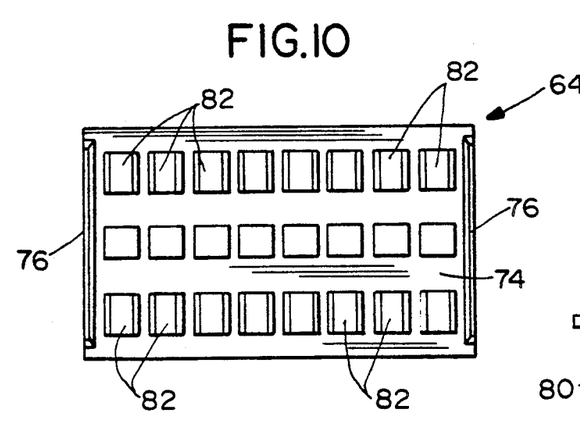
FIG. 10 is a top plan view of the base of FIG. 9.
Figure 11:
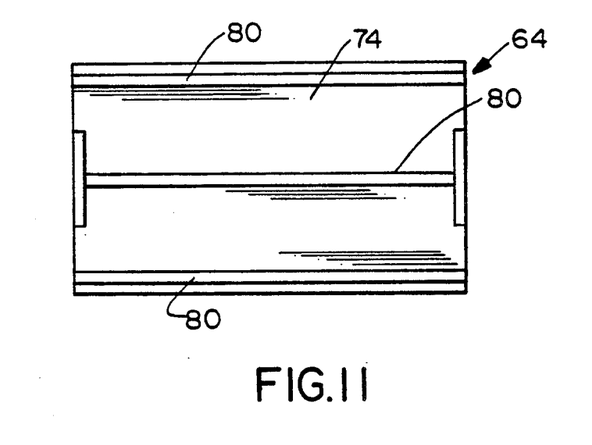
FIG. 11 is a bottom plan view of the base of FIG. 9.
Figure 12:
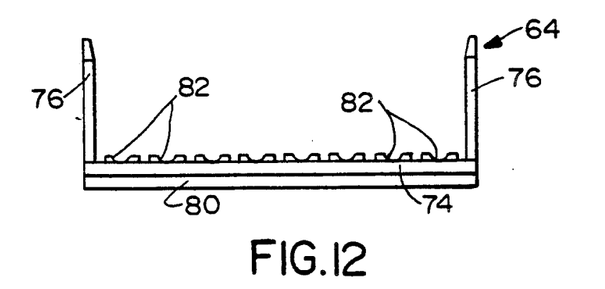
FIG. 12 is an end elevational view of the base of FIG. 9.
Figure 13:
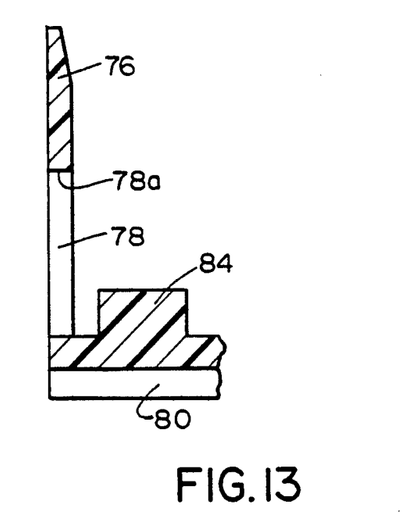
FIG. 13 is a vertical section taken generally along line 13—13 of FIG. 9.
Figure 14:
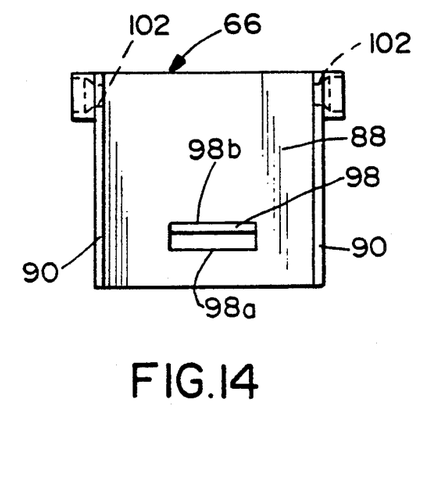
FIG. 14 is a side elevational view of the body of the housing means of the wire-trap electrical connector.
Figure 15:
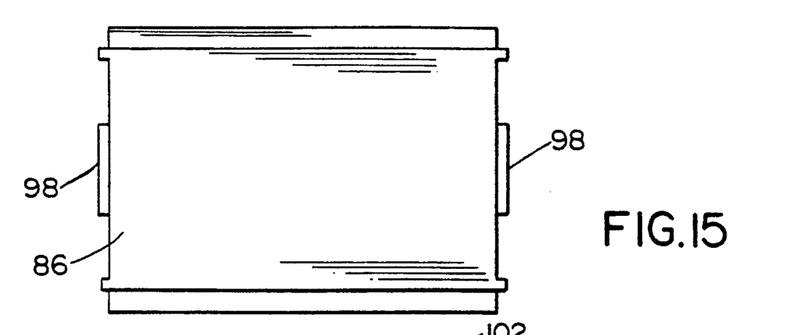
FIG. 15 is a top plan view of the body of FIG. 14.
Figure 16:
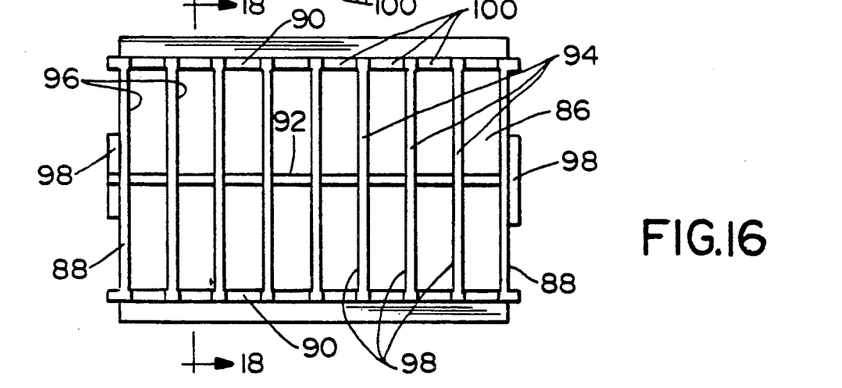
FIG. 16 is a bottom plan view of the body of FIG. 14.
Figure 17:
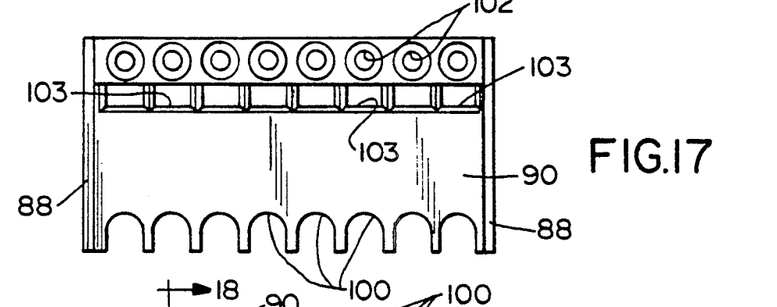
FIG. 17 is an end elevational view of the body of FIG. 14.

As seen best in FIGS. 10 and 12, the top surface of bottom wall 74 of base 64 is provided with two outer rows of raised trough sections 82 and a center row of raised bosses 84. As will be understood in relation to the following description of body 66, trough sections 82 form the lower parts of passage means extending through the connector for a plurality of in-line conductors 54. As shown, the illustrated embodiment of the connector can accommodate eight in-line conductors. The row of raised bosses 84 are provided to seat against the underside of crimp section 72 (FIG. 5) when the section is crimped about a stripped conductor section 54b (FIG. 4). To this end, it can be seen in FIGS. 4 and 19 how the raised bosses 84 are in alignment with the underside of crimp section 72 of terminal 62.

FIGS. 14-18 show various views depicting the details of body 66 of the two-part housing means (base 64 and body 66) of each wire-trap terminal 52. Specifically, each body 66 includes a top wall 86, an open bottom, a pair of side walls 88, a pair of end walls 90, a central partition 92 (FIGS. 16 and 18) running through the interior of the body between side walls 88, and a plurality of spaced interior partitions 94 dividing the interior of the body into a plurality of cavities 96. Each cavity is sized for receiving therein one leg of one of the U-shaped terminals 62. In other words, with the connector constructed for eight in-line conductors, as described above, two cavities 96 are provided for each conductor to accommodate the stripped ends 58 (FIG. 3) of sixteen discrete wires 56.

Body 66 is unitarily molded of dielectric material, such as plastic or the like, and each side wall 88 has an integrally molded, outwardly projecting latching detent 98 for latching into apertures 78 in the side walls 76 of a respective base 64. More particularly, looking at FIG. 14, a bottom portion 98a of each latching detent 98 is angled inwardly toward the respective side wall 88 to facilitate engaging and expanding a respective side wall 76 whereby the latching detent can pass on the inside of the side wall until a top flat shoulder 98b of the latching detent snaps behind a top edge 78a (FIG. 9) of the opening.

The end walls 90 of each body 66 are provided with a plurality of downwardly opening notches 100 (FIG. 17) which align with trough sections 82 (FIGS. 10 and 12) to define the passage means through the connector for in-line conductors 54. Each end wall 90 also is provided with a row of eight openings 102 at the top thereof which, as will be seen hereinafter, are aligned with distal ends 62a (FIG. 5) of legs 68 of terminals 62.

Figure 18:
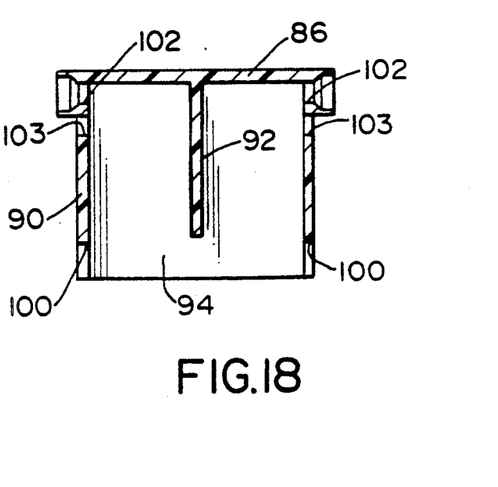
FIG. 18 is a section taken generally along line 18—18 of FIG. 16.

These openings provide ingress into the interior of body 66 by stripped ends 58 of wires 56. As described above in relation to FIG. 5, when the wires are inserted into the connector, through openings 102, the wires deflect legs 68 of terminal 62. The stripped ends of the wires become trapped between the distal ends of the terminal legs and the inside of top wall 86 of body 66. As seen best in FIGS. 16 and 18, central partition 92 prevents the stripped ends of the wires from engaging or shortening. Likewise, partitions 94 (FIG. 16) which define cavities 96, prevent engagement of any part of one terminal with an adjacent terminal. FIG. 18 shows that end walls 90 also are provided with openings 103 directly beneath openings 102, i.e., in registry with the legs of the terminals. Openings 103 provide access to the legs, such as by an appropriate tool or probe, to deflect the legs inwardly in order to release the trapped electrical wires.

Figure 19:
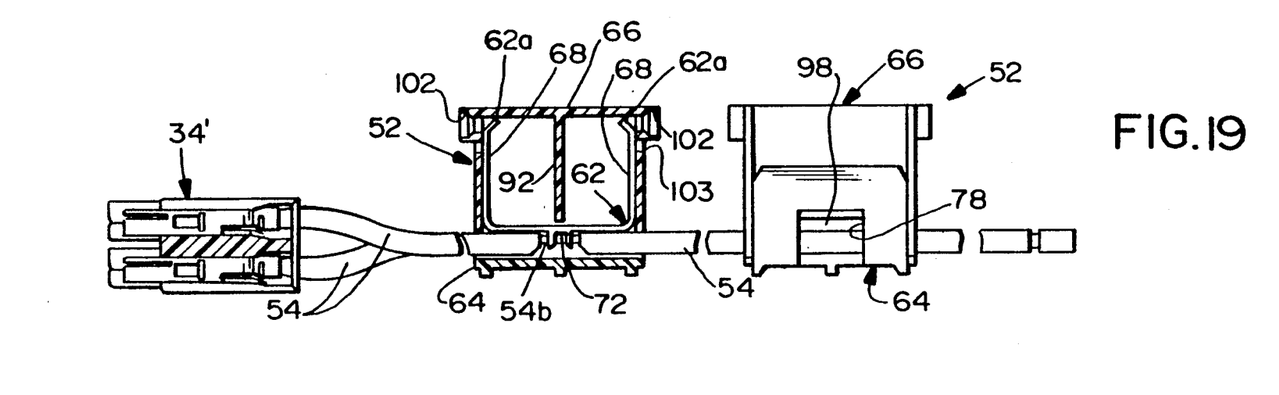
FIG. 19 is a view similar to that of FIG. 4, but with the components of the wire-trap electrical connectors assembled, with the left-hand connector in section and with the right-hand connector in elevation.

FIG. 19 shows the same components of wire-trap connectors 52 as described in relation to FIG. 4, but the components of the connectors are shown in fully assembled condition terminated to in-line conductors 54, and with the U-shaped terminals 62 ready to receive the stripped ends 58 of discrete wires 56. It can be seen by the right-hand connector 52 in FIG. 19 that one of the latching detents 98 on body 66 is snapped within opening 78 of base 64. The sectional depiction of the left-hand connector 52 illustrates how the two legs 68 of one of the U-shaped terminals are located within body 66 with their wire-trapping distal ends 62a in alignment with a pair of openings 102 at the top of body 66. Crimping sections of the terminal also can be seen crimped onto the stripped section 54b of in-line conductor 54. Lastly, center partition 92 of the body is seen dividing the interior of the body so that the stripped ends of the wires which are inserted through openings 102 do not engage and short.

Figure 20:
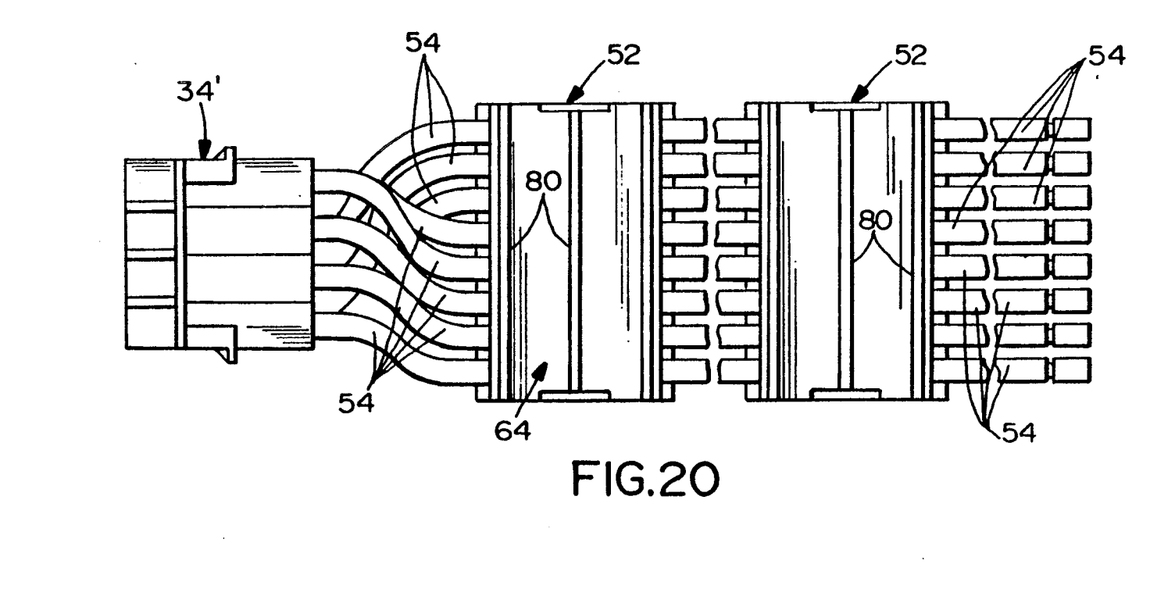
FIG. 20 is a top plan view of the assembled connectors as shown in FIG. 19.
Figure 21:
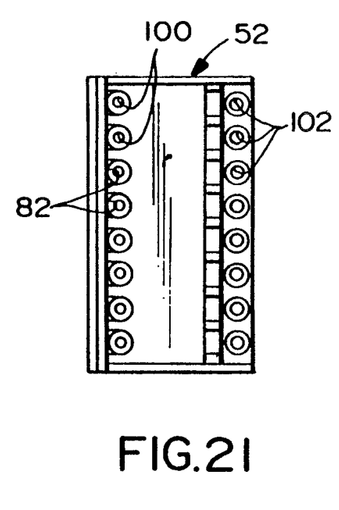
FIG. 21 is an end view of FIG. 20.

Lastly, FIG. 3 shows only two in-line conductors 54 and a given number of wires 56 in order not to detract from the illustration by shear numbers of wires. However, FIG. 20 shows wire trap electrical connectors 52 accommodating a full compliment of eight in-line conductors all running through the connectors and terminated to all eight terminals 60 (FIG. 4) in connector receptacle 34'. With this arrangement, as many as sixteen wires 56 can been terminated within each connector 52, two for each in-line conductor and its respective terminal 62. Of course, the number of in-line conductors and the number of stripped electrical wires would depend upon the particular equipment being serviced by the overall distribution system. In addition, it should be understood that more than two wire-trap connectors 52 can be incorporated lengthwise of the in-line conductors within a particular power module. Still further, it should be understood that the concepts of the invention embodied in each wire-trap electrical connector 52 are applicable in designing a connector for accommodating more or less than eight in-line conductors and the respective pairs of stripped electrical wires.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A wire-trap type electrical connector, comprising:

housing means defining an interior cavity with passage means through the cavity for receiving an in-line conductor, and a pair of openings in the housing for receiving the stripped ends of a pair of electrical wires; and a generally U-shaped terminal disposed in the cavity of the housing means and including a pair of leg portions joined by a bight portion, the leg portions having wire-trapping distal ends in registry with said openings for deflectingly engaging and trapping the stripped ends of the electrical wires inserted into the openings, and the bight portion having terminating means in registry with said passage means for termination to the in-line conductor.

2. The wire-trap type electrical connector of claim 1 wherein said distal ends of the leg portions are generally V-shaped to provide a two-point contact with the stripped ends of the electrical wires.

3. The wire-trap type electrical connector of claim 1 wherein said terminal comprises a one-piece component of stamped and formed metal material.

4. The wire-trap type electrical connector of claim 1 wherein said housing means include partition means between said pair of openings to prevent the stripped ends of the pair of electrical wires from engaging.

5. The wire-trap type electrical connector of claim 1 wherein said housing means include a plurality of said cavities in a side-by-side relationship, with a pair of said openings and a passage means for each cavity, for accommodating a plurality of said terminals and respective conductors and electrical wires.

6. The wire-trap type electrical connector of claim 1 wherein said housing means include a base and a generally hollow body, and complementary interengaging latch means between the base and the body.

7. The wire-trap type electrical connector of claim 1 wherein said housing means is generally box-shaped with said body defining five sides of the box and said base defining one side of the box.

8. The wire-trap type electrical connector of claim 1 wherein said terminating means comprise crimping means for crimping the terminal onto the in-line conductor.

9. The wire-trap type electrical connector of claim 8 where in said distal ends of the leg portions are generally V-shaped to provide a two-point contact with the stripped ends of the electrical wires.

10. The wire-trap type electrical connector of claim 1 wherein said housing means include a base and a generally hollow body, said openings being provided in the body.

11. The wire-trap type electrical connector of claim 10 wherein said passage means are defined by opposing portions of the base and the body.

12. The wire-trap type electrical connector of claim 10 wherein said passage means are defined by opposing portions of the base and the body.

13. A wire-trap type electrical connector, comprising:

housing means defining a plurality of interior cavities in a side-by-side relationship with passage means through the housing means and each cavity for receiving an in-line conductor, and a pair of openings in the housing for each cavity for receiving the stripped ends of a pair of electrical wires; and a generally U-shaped terminal disposed in each cavity and including a pair of leg portions joined by a bight portion, the leg portions having generally V-shaped wire-trapping distal ends in registry with a respective pair of said openings for deflectingly engaging and trapping the stripped ends of a respective pair of electrical wires inserted into the openings, the V-shape of the distal ends of the leg portions providing a two-point contact with the stripped ends of the electrical wires, and the bight portion having crimping means in registry with a respective passage means for crimping the terminal onto the in-line conductor.

14. The wire-trap type electrical connector of claim 13 wherein each terminal comprises a one-piece component of stamped and formed metal material.

15. A wire-trap type electrical connector, comprising:

housing means defining an interior cavity with passage means through the cavity for receiving an in-line conductor, and a pair of openings in the housing means for receiving the stripped ends of a pair of electrical wires, the housing means being generally box-shaped and including a base and a generally hollow body, the body defining five sides of the box and the base defining one side of the box, and including complementary interengaging latch means between the base and the body; and a generally U-shaped terminal disposed in the cavity of the housing means and including a pair of leg portions joined by a bight portion, the leg portions having wire-trapping distal ends in registry with said openings for deflectingly engaging and trapping the stripped ends of the electrical wires inserted into the openings, and the bight portion having terminating means in registry with said passage means for termination to the in-line conductor.

16. The wire-trap type electrical connector of claim 15 wherein said openings are provided in opposite sides of the body.

17. The wire-trap type electrical connector of claim 16 wherein said passage means are defined by opposing portions of the base and the body.

18. A wire-trap type electrical connector, comprising:

housing means defining an interior cavity with passage means through the cavity for receiving an in-line conductor, and a pair of openings in the housing means for receiving the stripped ends of a pair of electrical wires, the housing means being generally box-shaped and including a base and a generally hollow body, the body defining five sides of the box and the base defining one side of the box, said openings being provided in the body; and a generally U-shaped terminal disposed in the cavity of the housing means and including a pair of leg portions joined by a bight portion, the leg portions having wire-trapping distal ends in registry with said openings for deflectingly engaging and trapping the stripped ends of the electrical wires inserted into the openings, and the bight portion having terminating means in registry with said passage means for termination to the in-line conductor.

19. A wire-trap type electrical connector, comprising:

housing means defining an interior cavity with passage means through the cavity for receiving an in-line conductor, and a pair of openings in the housing means for receiving the stripped ends of a pair of electrical wires, the housing means being generally box-shaped and including a base and a generally hollow body, the body defining five sides of the box and the base defining one side of the box, said passage means being defined by opposing portions; and a generally U-shaped terminal disposed in the cavity of the housing means and including a pair of leg portions joined by a bight portion, the leg portions having wire-trapping distal ends in registry with said openings for deflectingly engaging and trapping the stripped ends of the electrical wires inserted into the openings, and the bight portion having terminating means in registry with said passage means for termination to the in-line conductor.

20. An electrical connector, comprising:

housing means defining an interior cavity with passage means through the cavity for receiving an in-line conductor, and a pair of openings in the housing for receiving the stripped ends of a pair of electrical wires; and a generally U-shaped terminal disposed in the cavity of the housing means and including a pair of leg portions joined by a bight portion, the leg portions having distal ends in registry with said openings for engaging the stripped ends of the electrical wires inserted into the openings, and the bight portion having terminating means in registry with said passage means for termination to the in-line conductor.

21. A wire-trap type electrical connector, comprising:

housing means defining an interior cavity with passage means through the cavity for receiving an in-line conductor, and a pair of openings in the housing for receiving the stripped ends of a pair of electrical wires; and a terminal disposed in the cavity of the housing means and including portions in registry with said openings for engaging and trapping the stripped ends of the electrical wires inserted into the openings, and terminating means in registry with said passage means for termination to the in-line conductor.

* * * * *